3,274,167
PREPARATION OF POLYETHYLENE IN THE PRESENCE OF A 2-BUTENE CHAIN TRANSFER AGENT
Kenneth W. Doak, Wyckoff, N.J., and Archie Hill, Pittsburgh, Pa., assignors to Koppers Company, Inc., a corporation of Delaware
No Drawing. Filed July 3, 1963, Ser. No. 292,737
5 Claims. (Cl. 260—88.2)

This invention relates to a new ethylene polymerization process. In one specific aspect, it relates to the high pressure preparation of modified polyethylene having improved physical strength and superior optical properties.

Polyethylene, made by the so-called high pressure processes, has extensive commercial utility in coating paper and wire, molding, and making thin film used as a packaging material. The end use to which a particular ethylene polymer is put depends primarily upon the density of the material and the molecular weight, as reflected by the melt index. Consideration must also be given to other physical properties, such as impact strength and stress crack resistance, and optical properties, such as haze value and see-through.

High pressure polyethylene is available commercially in densities ranging from 0.910–0.930 g./cc. with an accompanying wide range of melt index from about 0.15–40. Although the difference in the densities of available products is not numerically great, nevertheless, slight numerical changes in density often have a drastic effect on the physical, as well as the chemical, properties of the polymer. The present trend on the domestic market is to require a polymer having a density of at least 0.919 g./cc.

The molecular weight of the polymer determines its ultimate field of use. Ethylene polymers having a 0.2 melt index (high molecular weight) are used for wire coating; those having a melt index of 1.5–2 are suitable for the production of film; and those of a melt index of 8–40 (low molecular weight) are molding grade and paper coating materials.

A number of processes have been developed to provide an effective method of controlling the melt index of the ethylene polymer. Conventionally, this is accomplished by polymerizing in the presence of a chain transfer agent, or telogen. Chain transfer involves the termination of growing polymer chains, thus limiting the ultimate molecular weight of the material. Polymers produced in the presence of chain transfer agents are characterized by certain improvements in physical properties, such as processability, density, stiffness, yield point, film draw and tear strength. The melt index of the product polymer can be controlled as desired by varying the amount of chain transfer agent present during the polymerization.

One of the commercially successful processes involving polymerization of ethylene in the presence of a chain transfer agent is that of Arthur W. Barry et al., described in U.S. Patent 2,932,632. According to the Barry et al. process, polymerization is conducted in the presence of from 2–20 percent by weight of an alkane, such as propane or butane. The use of an alkane provides a product having improved tensile strength, stiffness, and film draw. It allows production of a product having a markedly higher density than that obtainable in the absence of a chain transfer agent. The physical properties of the polymer depend to a large extent upon the crystalline structure; in particular, the size, type, and amount of crystals. Only the degree of crystallinity is reflected by the density; products of higher density being more highly crystalline. As chain transfer agents, the alkanes provide a reasonable control of the molecular weight distribution of the polymer; a controlled molecular weight distribution being reflected by good optical properties. Alkanes have little, if any, effect on the size and arrangement of the crystalline structure of the polymer. Hence, products produced in their presence have only moderate strength properties.

Because of the comparatively large volume of alkanes required to make materials of high melt index, process control problems arise as a result of the build up of alkanes in the recycle gas. Furthermore, Barry et al. found that butane, because of its low volatility, was difficult to remove from the product polymer. Thus, processes wherein butane is used are generally followed by a somewhat expensive refining step.

Another approach to the problem of melt index control in the preparation of polyethylene by high pressure processes involves the copolymerization of ethylene with alpha-unsaturated olefins, such as propylene and butene-1. A process of this type is described by James M. Davison et al. in U.S. Patent 2,839,515. In the Davison et al. process, the alpha-olefin comonomer is present in an amount between 0.2 and 3 percent by volume, based on the ethylene. The alpha-olefin enters the polymer during the polymerization, but, at the same time, permits abstraction of hydrogen, thus serving to a limited extent as a chain transfer agent. The molecular weight distribution of the resulting product exhibits considerable variation, as shown by the optical properties, specifically by the variation in haze values from 7.2–13.5 for products of 2–3 melt index. It is essential, according to the process of Davison et al., to avoid the presence of other unsaturates in the alpha-unsaturated olefin. Davison et al. were careful to point out that other unsaturates should not be present in amounts exceeding 2 percent by volume, based on the volume of alpha-olefin.

Unfortunately, the formation of copolymers of ethylene and alpha-olefins, such as propylene and butene-1, provides a product of decreased density. The maximum product density obtainable by the Davison et al. process is about 0.919 g./cc., which, as we have noted hereabove, represents the lower limit of present-day commercial acceptability.

We have discovered a novel method of producing a modified polyethylene which surprisingly provides a product superior to both those obtained using pure chain transfer agents, such as butane, and those obtained using alpha-unsaturated comonomers, such as butene-1. In spite of the warnings voiced by Davison et al. to avoid the presence of unsaturates other than alpha-unsaturated olefins during high pressure ethylene polymerization, we have found that butene-2, when used as a modifier during the polymerization, unexpectedly provides the advantages of product quality separately obtainable through chain transfer processes and copolymerization, while, at the same time, avoids the disadvantages of both techniques.

We have found that the growing polymer chain abstracts hydrogen with considerably more efficiency from butene-2 than from butane; thus, butene-2 can be used in much smaller amounts and the problems of its removal from the polymer and from the recycle gas are substantially eliminated. Butene-2 provides a better control of the molecular weight distribution than either butane or butene-1, as evidenced by haze values as low as 5 for products of 2 melt index (film grade). Unlike butane, butene-2 to a limited extent, enters the polymer chain. This limited degree of copolymerization does not, as in the case of propylene and butene-1, adversely affect the density of the product. The degree of crystallinity, thus the density, is substantially the same as that obtainable with butane. Unexpectedly, the limited degree of copolymerization appears to reduce the size of crystals, thus promoting a cohesive effect which, in turn, results in measurably improved (when compared with products made with butane) dart impact strength and stress crack resistance. Therefore, butene-2, which functions primarily as a chain transfer agent and only to a limited extent as a comonomer, provides, because of its enhanced chain transfer activity, products having better molecular weight distribution and, therefore, better optical properties then either a product made by a pure chain transfer process or a product made by copolymerization with an alpha-olefin. Because of the limited degree of copolymerization and its resulting effect on the arrangement of the crystal structure, products made using butene-2 have superior physical strength.

It is, therefore, an object of the present invention to provide a new high pressure ethylene polymerization process resulting in a polyethylene product of improved physical strength and optical properties.

In accordance with the invention, the polymerization of ethylene at temperatures of 250–300° C. and pressures of 20,000–50,000 p.s.i.g. in the presence of a catalytic amount of oxygen initiator is governed by conducting the polymerization in the presence of 0.05–1.5 percent by volume of butene-2, based on the ethylene. The molecular weight of the product is lowered, as evidenced by the increase in melt index, within the range of 0.15–40 as the amount of butene-2 present is increased. Sufficient oxygen initiator must be present during the polymerization to compensate for the presence of butene-2 and to maintain a predetermined temperature within the range of 250–300° C. at a predetermined pressure of 20,000–50,000 p.s.i.g. in the presence of a predetermined amount of butene-2 within the above indicated range. The resulting product of desired molecular weight is characterized by improved optical properties, such as haze, gloss, see-through, and grain, and improved physical strength, as evidenced by dart impact strength, bag drop, and stress crack resistance. The product has a density of at least 0.919 g./cc. and often as high as 0.927–0.930 g./cc.

Although the process of the invention can be operated semi-continuously or batch-wise, it is preferably carried out in the conventional tubular reactor, which consists of a tube of great length and small cross-sectional area.

The reaction pressure, which ranges between 20,000 and 50,000 p.s.i.g. is predetermined, the choice of pressure being dictated to some extent by the density requirements of the polyethylene being produced. To provide the higher density polymers, higher pressures are required. Excellent results are obtained at pressures between 20,000 and 35,000 p.s.i.g. The upper limit of the reaction pressure is determined by the mechanical strength of the reactor and the compressor. The highest practical pressure is preferred, because higher conversions can be obtained at such pressures.

The rate of reaction is also measurably effected by the peak temperature. In the process of the invention, excellent results are obtained in the range of 250–300° C., although higher conversions are obtained in the upper portion of the range. The temperature of the reaction also affects the properties of the polymer. For this reason, the temperature is predetermined within the above indicated range, the temperature choice being dictated by the properties desired in the final product.

The desired reaction temperature is maintained by the concentration of molecular oxygen initiator, the exact amount of oxygen to reach a given temperature varying with the change in pressure, and also with the amount butene-2 present, as explained hereinafter. At pressures in the range of 20,000–23,000 p.s.i.g., about 15–40 parts per million, based on the ethylene, oxygen are used. When pressures reach the 35,000 p.s.i.g. level, only 0.5–2.5 parts per million oxygen are required.

The amount of butene-2 modifier present during the polymerization varies from 0.05–1.5 percent by volume, based on the ethylene, and is increased as the desired melt index is increased. Butene-2, when present in amounts less than 0.05 percent, has little effect on the properties of the product. If more than about 1.5 percent is used, the molecular weight of the product is lowered to an extent that it lacks commercial utility. The exact amount of butene-2 required to provide a product of the desired melt index varies considerably with the reaction pressure. For example, at pressures of about 35,000 p.s.i.g., 0.15 melt index material is made using 0.3 percent by volume butene-2. At this same pressure 0.55 percent butene-2 will provide a product having a .7 melt index; 0.7 percent butene-2, 2 melt index; 1.2 percent butene-2, 16–24 melt index; and 1.5 percent butene-2, 30–40 melt index. If the pressure is lowered to about 22,000 p.s.i.g., only 0.05 percent butene-2 is required to provide material having a melt index of 0.15 and 0.75 percent butene-2 will provide the high melt index product.

Butene-2 consumes oxygen present in the system during polymerization. If the oxygen level is maintained at that required to initiate reaction and provide a predetermined temperature at a predetermined pressure in the absence of a modifier, the addition of butene-2 to the system will consume oxygen to such an extent that the temperature cannot be maintained and the molecular weight of the product becomes so high that it can hardly be removed from the reactor. By providing additional oxygen in the system, sufficient to compensate for the amount of butene-2 as determined by the ability to maintain the desired predetermined temperature at the predetermined pressure in the presence of the amount of butene-2 required at that pressure to provide the desired melt index, the reaction proceeds smoothly and the desired product is obtained.

By infrared spectrometric analysis the product polymer is shown to have an average of 21.7 methyl groups per thousand carbon atoms, 0.573 double bonds per thousand carbon atoms and a percent distribution of unsaturated groups as follows: $RRC=CH_2$, 45; $RCH=CH_2$, 27; and $t\text{-}RCH=CHR$, 28. The foregoing data is evidence of the limited degree of copolymerization between ethylene and butene-2.

In the examples hereinunder the following methods were used to evaluate the polymer and films formed therefrom by extrusion:

*Melt index.*—ASTM D–1238–52T was used to determine the melt index, which is defined as the rate of flow of the molten plastic in grams/10 minutes through an orifice 0.0825 inch in diameter by 0.315 inch long at 190° C. under pressure of 43.1 p.s.i.g.

*Density.*—The density was determined on a plaque 0.070 inch in thickness compression molded at 170° C. and cooled in the press under pressure by running cold water through the platens. The specimen was annealed in an oven for 48 hours at 60° C. The density was determined by floatation in a liquid at 23° C. (see E. Hunter and W. G. Oakes, Trans. Faraday Soc. 41 (1945)).

*Haze.*—Haze was determined according to ASTM DM–1003–59T using a Gardner laboratory hazemeter.

*Gloss.*—Gloss was determined according to ASTM 523–53T using a 45° head.

*Tensile strength.*—Tensile in p.s.i. was determined according to ASTM DM–822–56T.

*Dart impact strength.*—Dart impact strength, measured in grams, was determined according to ASTM D–1709–57T.

*Bag drop.*—Bag drop, measured in feet height, is described in U.S. Department of Commerce Commercial Standard CS 227–59, Test Method 7.7.3.

Our invention is further illustrated by the following examples:

EXAMPLE I

Ethylene was fed at a rate of 17,200 lbs./hr. to a tubular reactor at a pressure of 31,500 p.s.i.g. and polymerized at a peak reaction temperature of 255° C. in the presence of 1.74 parts per million of oxygen (2.9 standard cubic feet/hour). To the ethylene feed there was added 0.60 percent by volume butene-2 based on the volume of ethylene. The melt index of the resulting polymer was 2.0 and the density at 23° C. was 0.925. Blown film made from the polymer had a haze value of 5 percent and a gloss determination of 61.

EXAMPLE II

Ethylene at a pressure of 23,500 p.s.i.g. was polymerized in a tubular reactor at a peak reaction temperature of 278° C. in the presence of 24 parts per million of oxygen and 0.3 percent by volume of butene-2, the amount of both oxygen and butene-2 being based on the ethylene. The melt index of the resulting polymer was 2.5 and the density was 0.919.

EXAMPLE III

The procedure of Examples I and II was repeated, varying the amount of butene-2 to provide products having a wide range of melt index. The reaction conditions, melt index and density of the polymer are given below in Table I.

*Table I*

|  | 1 | 2 | 3 |
|---|---|---|---|
| Ethylene feed, lb./hr | 17,200 | 17,200 | 17,200 |
| Pressure, p.s.i.g | 35,000 | 35,000 | 35,000 |
| Maximum Temperature, ° C | 300 | 265 | 278 |
| Oxygen, p.p.m | 1.2 | 1.8 | 1.9 |
| Butene-2, volume percent | 0.55 | 0.7 | 1.2 |
| Melt Index | 0.7 | 2 | 16-24 |
| Density, g./cc | 0.923 | 0.925 | 0.924 |

EXAMPLE IV

Film-grade resins were prepared according to the procedure of the foregoing examples using both butene-2 and butane to obtain products having identical density and melt index. The reaction conditions, melt index, and optical properties of the resulting polymer are given below in Table II.

*Table II*

|  | Butene-2 | Butane |
|---|---|---|
| Pressure, p.s.i.g | 35,000 | 35,000 |
| Maximum Temp., ° C | 265 | 275 |
| Oxygen, p.p.m | 1.33 | 0.9 |
| Modifier Conc., volume percent | 0.7 | 2.4 |
| Melt Index | 2 | 2 |
| Density, g./cc | 0.925 | 0.925 |
| Haze | 5.4 | 6.3 |
| Gloss | 69 | 60 |

It is seen from the data in Table II that the product made using butene-2 has a lower haze value and higher gloss than that made using butane. In contrast with butene-2, about 3½ times as much butane was required to produce a polymer having the same density and melt index.

EXAMPLE V

The procedure of Example IV was repeated and the product polymers of comparable density and melt index were compared with respect to tensile strength, haze, gloss, dart impact strength, and bag drop. The results are shown in Table III.

*Table III*

| Modifier | MI | Density, g./cc. | Tensile, p.s.i. | Haze | Gloss | Dart Impact, g. | Bag Drop, ft. height |
|---|---|---|---|---|---|---|---|
| Butene-2 | 2.0 | 0.9254 | 2,460 | 4.32 | 78.9 | 84 | 4 |
| Butane | 2.1 | 0.9260 | 2,360 | 5.9 | 66.2 | 52.5 | 2 |
| Butene-2 | 2.4 | 0.9251 | 2,510 | 4.91 | 80.4 | 73 | 4 |
| Butane | 2.4 | 0.9240 | 2,150 | 6.0 | 67.0 | 46.7 | 3 |

The products made with butene-2 unexpectedly show a 60 percent increase in impact strength and are superior in their tensile strength, haze value, gloss, and bag drop.

EXAMPLE VI

Ethylene at a pressure of 21,500 p.s.i.g. was polymerized in a tubular reactor at a peak reaction temperature of 280° C. Oxygen was fed into the reactor at a rate of 2.9 standard cubic feet/hour and 0.3 volume percent butene-2 was introduced into the reactor. The amount of butene-2 was increased to 0.51 percent over a period of one hour, during which time the temperature dropped from 280-250° C. in spite of the fact that the oxygen concentration was increased from 2.8-3.4 standard cubic feet/hour. The molecular weight, as indicated by the melt index, became so high that it was difficult to remove the product from the reactor. The melt index of the material was 0.037, which is well outside of the range of commercial utility.

This example illustrates that butene-2 consumes oxygen during the reaction and failure to have sufficient oxygen present to maintain the predetermined reaction temperature (at the predetermined pressure in the presence of the amount of butene-2 required to provide a product of the desired melt index) results in the formation of a product of extremely low melt index. The production of this useless material was believed by prior art workers to have been the natural result of the presence of unsaturates other than alpha-olefins during high pressure ethylene polymerization.

We claim:
1. In the polymerization of ethylene at temperatures of 250-300° C. and pressures of 20,000-50,000 p.s.i.g. in the presence of sufficient oxygen to initiate the reaction and maintain a predetermined temperature at a predetermined pressure within the above indicated ranges, the improvement comprising polymerizing ethylene in the presence of 0.05-1.5 percent by volume butene-2, based on the ethylene, the melt index increasing within the range of 0.15-40 as the amount of butene-2 present is increased, and providing sufficient additional oxygen initiator during the polymerization to compensate for the presence of butene-2, thereby maintaining a predetermined temperature within the range of 250-300° C. at a predetermined pressure of 20,000-50,000 p.s.i.g. in the presence of a predetermined amount of butene-2 within in the above indicated range, and providing a product of the desired melt index, characterized by improved optical properties and physical strength and a density of at least 0.919 g./cc.

2. In the polymerization of ethylene at temperatures of 250-300° C. and pressures of 20,000-50,000 p.s.i.g. in the presence of a catalytic amount of an oxygen initiator, the improvement comprising polymerizing ethylene in the presence of 0.05-1.5 percent by volume butene-2, based on the ethylene, and oxygen in an amount sufficient to compensate for the presence of butene-2, and to maintain a predetermined temperature within the range of 250-300° C. at a predetermined pressure of 20,000-50,000 p.s.i.g. to provide a polyethylene product, having a density of at least 0.919 g./cc. and a melt index of 0.15 to 40, said product being characterized by improved optical properties and physical strength and the melt index thereof being regulated to a predetermined level by the amount of butene-2 present during the polymerization.

3. In the polymerization of ethylene at temperatures of 250-300° C. and pressures of 20,000-50,000 p.s.i.g. in the presence of a catalytic amount of an oxygen initiator, the improvement comprising controlling the molecular weight of the polyethylene product, as reflected by the melt index thereof, by polymerizing ethylene in the presence of 0.05-1.5 percent by volume butene-2, based on the ethylene, the melt index increasing within the range of 0.15–40 as the amount of butene-2 present is increased, and providing sufficient oxygen initiator during the polymerization to compensate for the presence of the butene-2 and to maintain a predetermined temperature within the range of 250–300° C. at a predetermined pressure of 20,000–50,000 p.s.i.g. in the presence of a predetermined amount of butene-2 within the above indicated range, thereby providing a product of the desired molecular weight characterized by improved optical properties and physical strength and a density of at least 0.919 g./cc.

4. In the polymerization of ethylene at temperatures of 250–300° C. and pressures in the range of 35,000 p.s.i.g. in the presence of sufficient oxygen to initiate the reaction and maintain a predetermined temperature within the above indicated range, the improvement comprising polymerizing ethylene in the presence of 0.3–1.5 percent by volume butene-2, based on the ethylene, the melt index increasing within the range of 0.15–40 as the amount of butene-2 present is increased, and providing oxygen initiator in an amount of 0.5–2.5 p.p.m., based on the ethylene, during the polymerization, thereby maintaining a predetermined temperature within the range of 250–300° C. in the presence of a predetermined amount of butene-2 within the above-indicated range, and providing a product of the desired melt index, characterized by improved optical properties and physical strength and a density of at least 0.919 g./cc.

5. In the polymerization of ethylene at temperatures of 250–300° C. and pressures in the range of 22,000 p.s.i.g. in the presence of sufficient oxygen to initiate the reaction and maintain a predetermined temperature within the above indicated range, the improvement comprising polymerizing ethylene in the presence of 0.05–0.75 percent by volume butene-2, based on the ethylene, the melt index increasing within the range of 0.15–40 as the amount of butene-2 present is increased, and providing oxygen initiator in an amount of 15–40 p.p.m., based on the ethylene, during the polymerization, thereby maintaining a predetermined temperature within the range of 250–300° C. in the presence of a predetermined amount of butene-2 within the above indicated range, and providing a product of the desired melt index, characterized by improved optical properties and physical strength and a density of at least 0.919 g./cc.

References Cited by the Examiner
UNITED STATES PATENTS

| | | | |
|---|---|---|---|
| 2,839,515 | 6/1958 | Davison et al. | 260—94.9 |
| 3,090,778 | 5/1963 | Ehrlich et al. | 260—94.9 |
| 3,092,614 | 6/1963 | Erdmann et al. | 260—94.9 |

JOSEPH L. SCHOFER, *Primary Examiner.*

L. EDELMAN, *Assistant Examiner.*